US007070372B2

(12) United States Patent
Denike et al.

(10) Patent No.: US 7,070,372 B2
(45) Date of Patent: Jul. 4, 2006

(54) PORTABLE CYLINDER HOLDER, CARRIER AND SECURING SYSTEM

(76) Inventors: Richard L. Denike, 960 Myrtle Road West., Ashburn, Ontario (CA) L0B 1A0; Ab Neufeldt, P.O. Box 938, Station B, Willowdale, Ontario (CA) M2K 2T6

( * ) Notice: Subject to any disclaimer, the term of this patent is extended or adjusted under 35 U.S.C. 154(b) by 0 days.

(21) Appl. No.: 10/774,442

(22) Filed: Feb. 10, 2004

(65) Prior Publication Data

US 2004/0159621 A1 Aug. 19, 2004

(30) Foreign Application Priority Data

Feb. 14, 2003 (CA) .................................... 2419127

(51) Int. Cl.
*B60P 7/08* (2006.01)

(52) U.S. Cl. ........................ 410/46; 410/42; 211/85.18

(58) Field of Classification Search .................. 410/35, 410/36, 42, 46; 206/391, 404, 446, 595, 206/596; 248/146, 154; 224/404, 405; 211/70.4, 211/71.01, 85.18; 137/376; 108/55.1, 55.5
See application file for complete search history.

(56) References Cited

U.S. PATENT DOCUMENTS 2,278,232 A * 3/1942 Anderson ...................... 211/8
3,547,273 A * 12/1970 Bompart ...................... 211/84
3,602,368 A * 8/1971 Gould ........................ 206/598
3,907,117 A * 9/1975 Williams ................. 211/85.19
4,295,431 A * 10/1981 Stavlo ...................... 108/55.1
4,391,377 A 7/1983 Ziaylek, Jr.
5,154,556 A * 10/1992 Wappel ....................... 410/36
5,176,265 A * 1/1993 Bennett
5,292,012 A * 3/1994 Davis et al. ............. 211/85.18
5,378,106 A * 1/1995 Risley et al. ............... 414/608
6,065,915 A * 5/2000 Ruehl et al. .................. 410/36
6,220,557 B1 4/2001 Ziaylek et al.
6,685,404 B1 * 2/2004 Udivich et al. ............... 410/42

FOREIGN PATENT DOCUMENTS

CA 2262713 2/1999

* cited by examiner

*Primary Examiner*—Stephen Gordon

(57) ABSTRACT

The present invention is a portable holder for use in transporting cylinders such as gas cylinders that are used by fire and rescue services. The holder is constructed with one or more compartments with a rotatable handle that is used to secure the cylinders in the holder as well as engage a locking mechanism located in the base. The locking mechanism in the base is used to secure the holder to a receiving element such as a rail that may be located in a rack or compartment. The holder enables secure transport of gas cylinders when in a vehicle, stationary location and when carried by hand.

6 Claims, 5 Drawing Sheets

PORTABLE CYLINDER HOLDER, CARRIER AND SECURING SYSTEM

FIELD OF INVENTION

The present invention relates to the transportation and storing of pressurized gas cylinders.

BACKGROUND

The use of cylinders or tanks that contain pressurized gas such as air or oxygen are commonly in fields such as fire and rescue for use in conjunction with a breathing apparatus. The environment in which these cylinders are handled is typically less than ideal. Improper storage and transportation of cylinders presents a safety issue due to the high pressures involved, typically 2216 psig or 4500 psig. The environments in which these cylinders may be exposed, and the standard methods of handling of the cylinders, place considerable wear and tear and decrease the life span and reliability. Typically, the only means of carrying a cylinder is by the valve assembly and there is no inherent means of ensuring stability when placed on a surface or the ground. At a location such as an emergency scene, it is quite easy for a cylinder to roll when placed on the ground and become a hazard itself. The result may be damage to the cylinder, such as a broken valve, or even damage to people or surrounding objects if the cylinder or valve is ruptured.

The prior art addresses a means for mounting and supporting cylinders on a wall surface. For example, U.S. Pat. No. 6,220,557 B1, by Ziaylek et al., issued Apr. 24, 2001 entitled "Mounting Bracket For Detachably Supporting A Generally Cylindrically-Shaped Member Upon A Wall Surface", details a method for securing and storing a cylinder at a stationary location. This prior art document only addresses a means of storing a cylinder at a fixed location and does not consider issues with the transportation of cylinders. In the example of emergency services, stationary storage only encompasses one of many modes in which a gas cylinder will traverse.

Transportation systems for use in vehicles is detailed in the prior art as well. One such system is described in U.S. Pat. No. 4,391,377, by Ziaylek, Jr., issued Jul. 5, 1983 entitled "Knock-Down Assembly For Supporting Oxygen Tanks". This patent discloses an assembly for supporting oxygen tanks and is widely used by emergency services in vehicles as well as at storage location such as fire stations. However, the prior art does not address the transportation of cylinders outside of a vehicle or stationary rack, for example at a fire or rescue scene. When the cylinder is removed outside of the assembly and is being transported by hand or placed on the ground, it is the most vulnerable to damage and a potential cause of injury if not secured properly.

In considering all the potential hazards that may be encountered in the operational life of a gas cylinder, particularly in the fire and rescue fields, the prior art does not adequately address the safety and handling of the cylinder outside of a stationary location and vehicles such as fire stations and fire trucks.

SUMMARY OF INVENTION

The present invention provides a means of storage and handling of preferably up to two gas cylinders. The invention stabilizes, protects and secures the cylinders during all phases of transporting and handling.

The system incorporates a two cylinder tote device or holder with a handle mechanism that secures the cylinders inside the holder. The holder can be placed in a rack or shelf arrangement for use either at a stationary location or in a compartment of a vehicle, such as a fire truck. Multiple holders can be oriented vertically or horizontally in the rack enabling easy access to individual holders.

The holder incorporates a locking mechanism that ensures that the cylinders are secured within the holder. The handle of the holder acts as a means for securing the cylinders inside the holder by restricting the movement of the cylinders when in a closed or locked position.

In addition, the handle can be used to engage and disengage a locking mechanism located in a recess in the base of the holder. The base of the holder is designed to fit over a receiving element. One example of the receiving element would be a rail such as a z-rail, which may be located in a rack and is used to engage the locking mechanism to secure the holder to the rack. The holder has a flat base that allows it to be freestanding in an upright position reducing the chance of the cylinders falling over and rolling freely.

Although it is preferred that the holder is used in conjunction with a rack, the holder can also be mounted in a compartment of a vehicle without a rack.

In accordance with one aspect of the present invention, there is provided a portable holder for use in holding at least one cylinder, comprising: a frame forming at least one compartment; and a rotatable handle means mounted for rotation on said frame means, said handle means being rotatable between an open position and a closed position; wherein, said at least one compartment can contain said at least one cylinder on a one-to-one basis; and wherein, in said closed position said handle retains said at least one cylinder within said at least one compartment and in said open position said handle allows said at least one cylinder to be removed from said at least one compartment.

In accordance with another aspect of the present invention, there is provided a portable holder for use in holding two cylinders, comprising: frame means forming two compartments; and a rotatable handle means located between said compartments for rotation on said frame means, said handle means being rotatable between an open position and a closed position; and wherein, in said closed position said handle can retain at least one of said cylinders within said compartments and in said open position said handle allows either or both of said two cylinders to be removed from said compartments.

Other aspects and features of the present invention will become apparent to those ordinarily skilled in the art upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
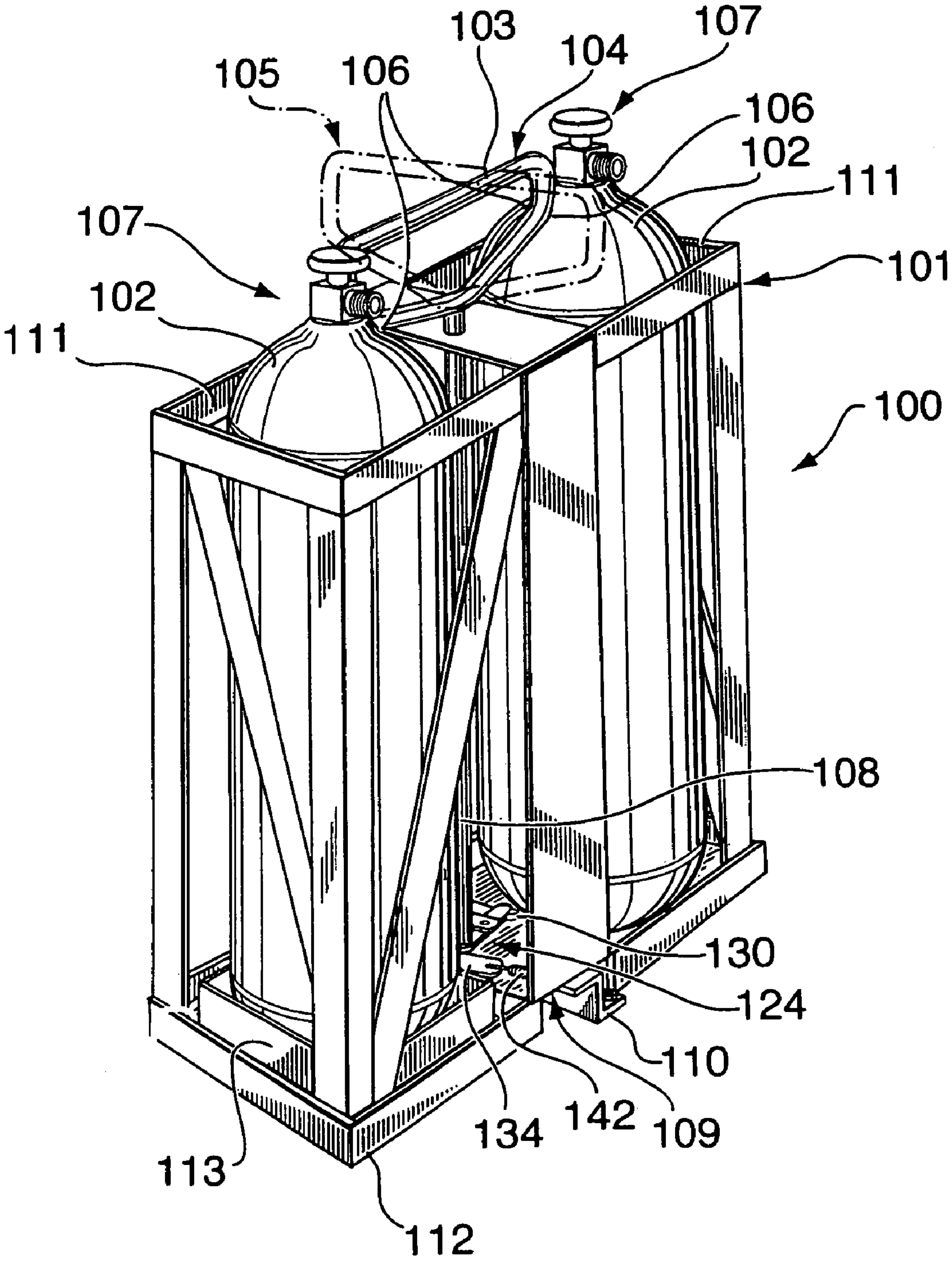
FIG. 1 is an illustration of an embodiment of the cylinder holder.

FIG. 1 and the associated description represent an embodiment of the present invention a portable cylinder holder (100). The cylinder holder frame (101), may consist of individual frame members or be formed out of a solid structure from metal, plastics, composites or alloy materials but is not limited to these materials. The frame is designed so that one or two cylinders (102) can be placed inside the holder in compartments (111) located on either side of a handle (103). The compartments (111) enclose the cylinders so that they can only be accessed from the top when the handle is in an open or unlocked position (105), with the cylinder oriented so that the valves (107) are upright.

The handle has two positions, closed or locked (104) and open or unlocked (105). The handle acts as a barrier to stop the cylinders from being removed from the compartments by making contact with the top of the cylinders (at point 106) thereby restricting their movement. The handle when in the locked position (104), is designed so that it does not protrude past the valve assembly of the cylinders thus minimizing the overall space required for the holder and cylinders when placed in storage. If the height of the holder is not an issue for storage, a larger more accessible handle can be used that may extend past the top of the valve assembly of the cylinders.

The bottom of the compartment may contain a cup portion (113) shaped to hold the base of a cylinder thus minimizing the movement of the base of the cylinder within the compartment. The compartments are sufficiently snug as to minimize movement of the cylinders during transport. However, the cylinders can be easily removed from the top, when the handle is in the open position. The base (112) of the holder is generally flat allowing the holder to stand upright. The holder is designed to be stable when placed on the ground even when only one compartment contains a cylinder.

Figure 4:
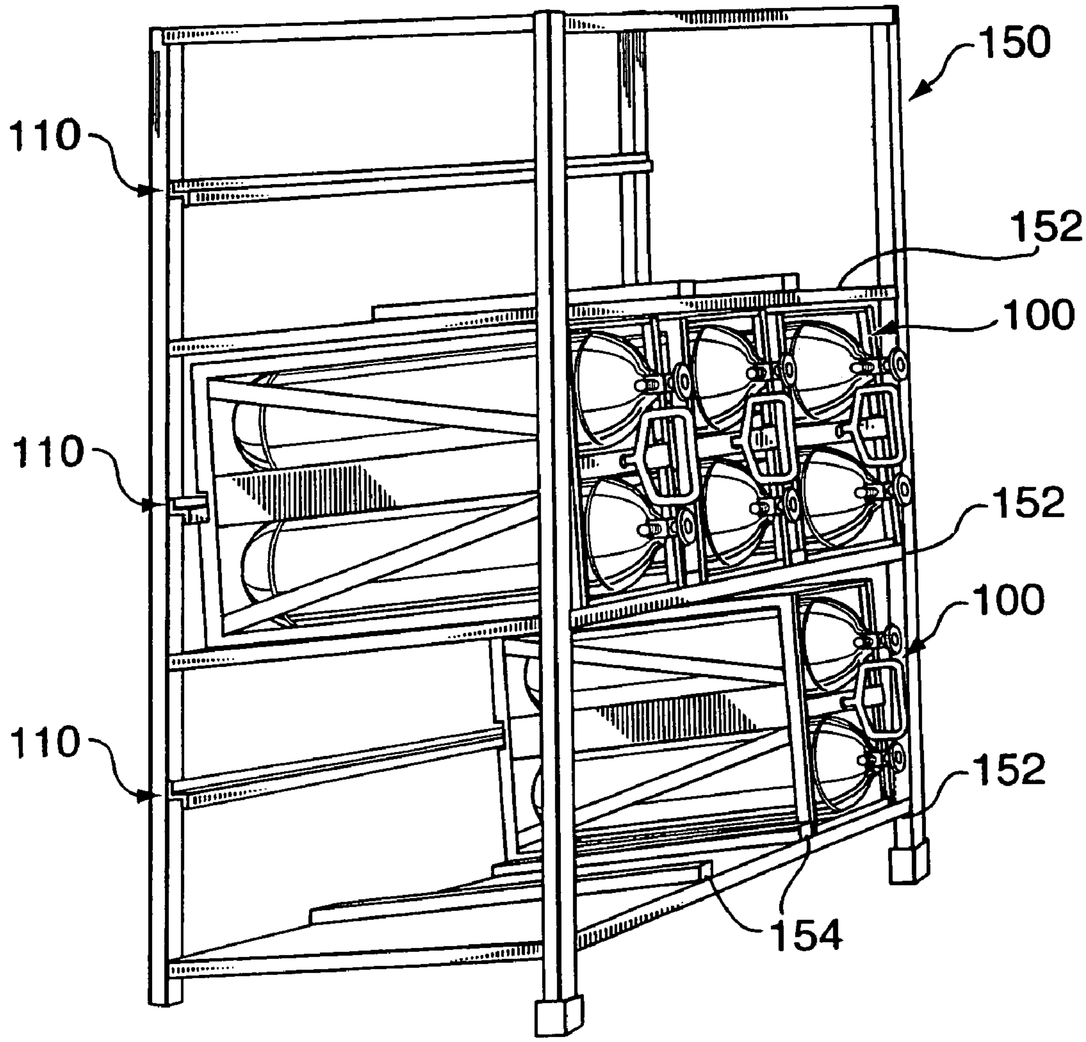
FIG. 4 is a view of a horizontal rack used for securing multiple holders.
Figure 5:
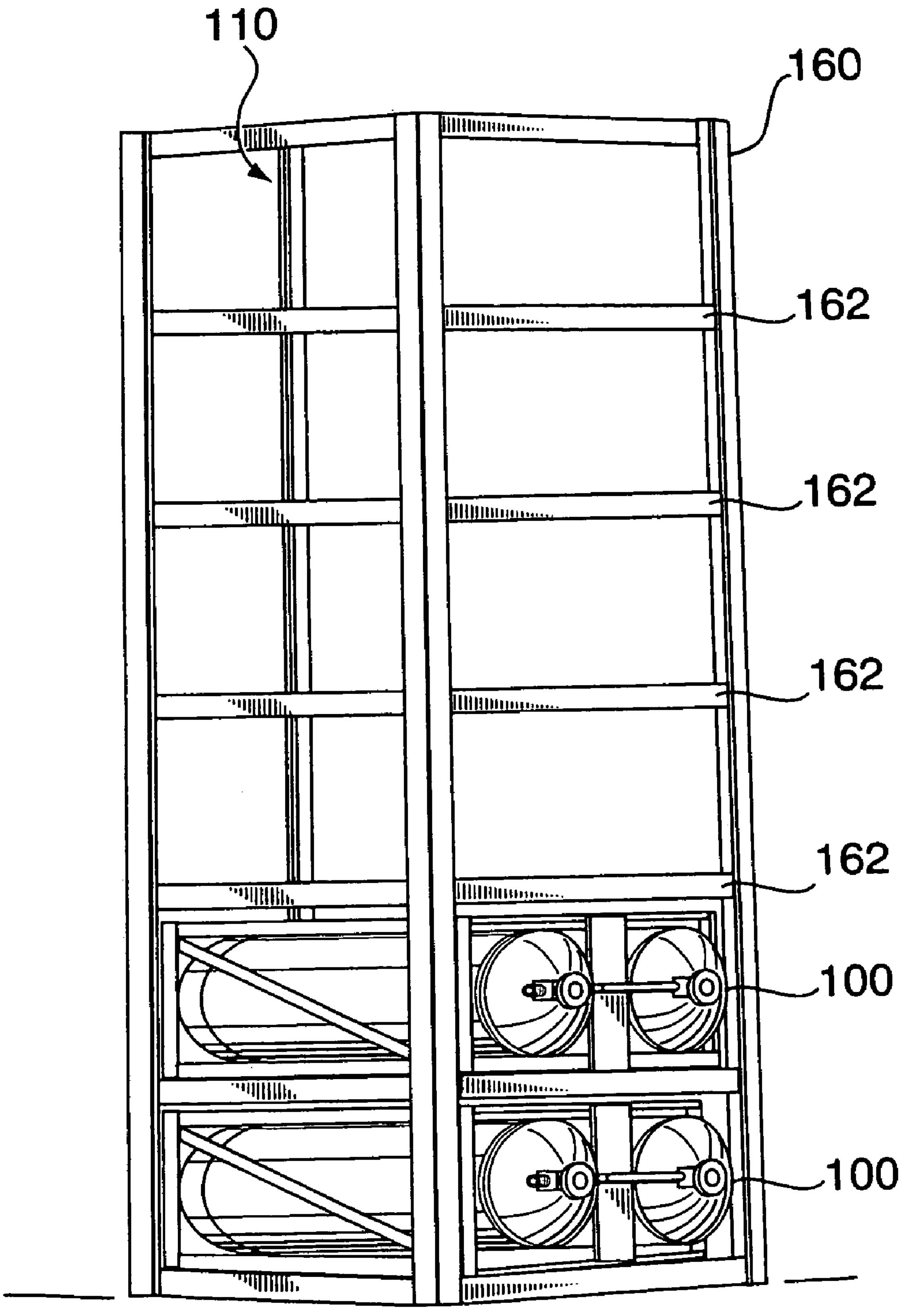
FIG. 5 is a view of a vertical rack used for securing multiple holders.

A locking mechanism for securing the holder to a receiving element, which could be a rail or z-rail (110), is located in a recess (109) of the flat holder base (112) and is engaged when the handle (103) is turned to the locked or closed position (104). One possible embodiment of the mechanism is detailed in FIG. 2*a*. When in the locked position (104), the holder can be stored and secured in a horizontal or vertical orientation in an assembly such as a rack as shown in FIGS. 4 and 5.

The handle is connected to the locking mechanism through a shaft (108). The handle is of sufficient size and strength to support comfortably the weight of the cylinders and holder during transportation.

Figure 2A:
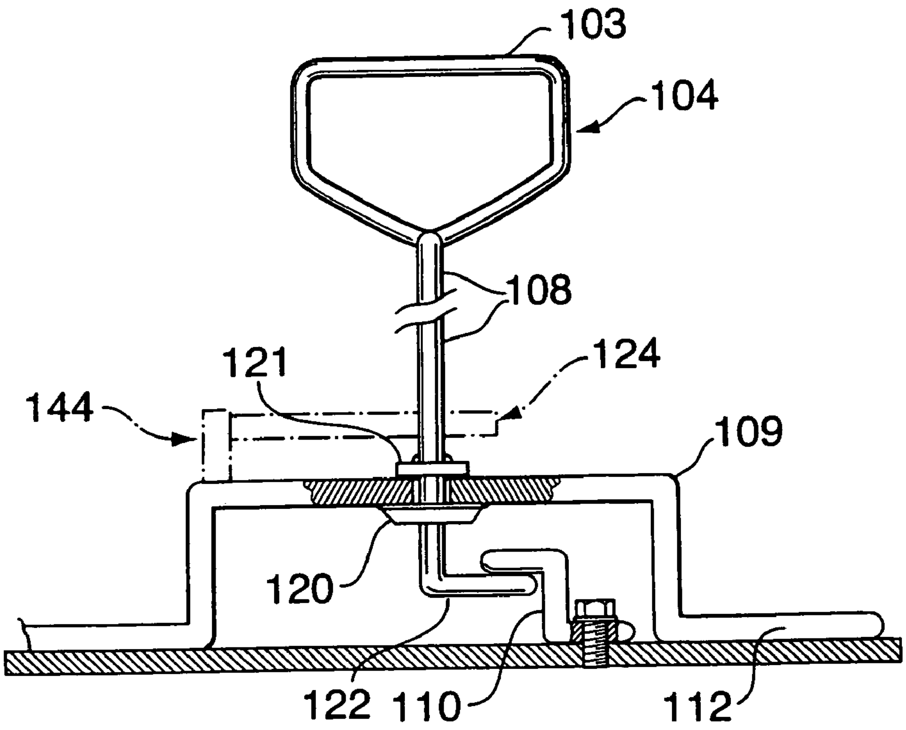
FIG. 2*a* is a side view of an embodiment of the handle and locking mechanism of the cylinder holder in the closed or locked position.
Figure 2B:
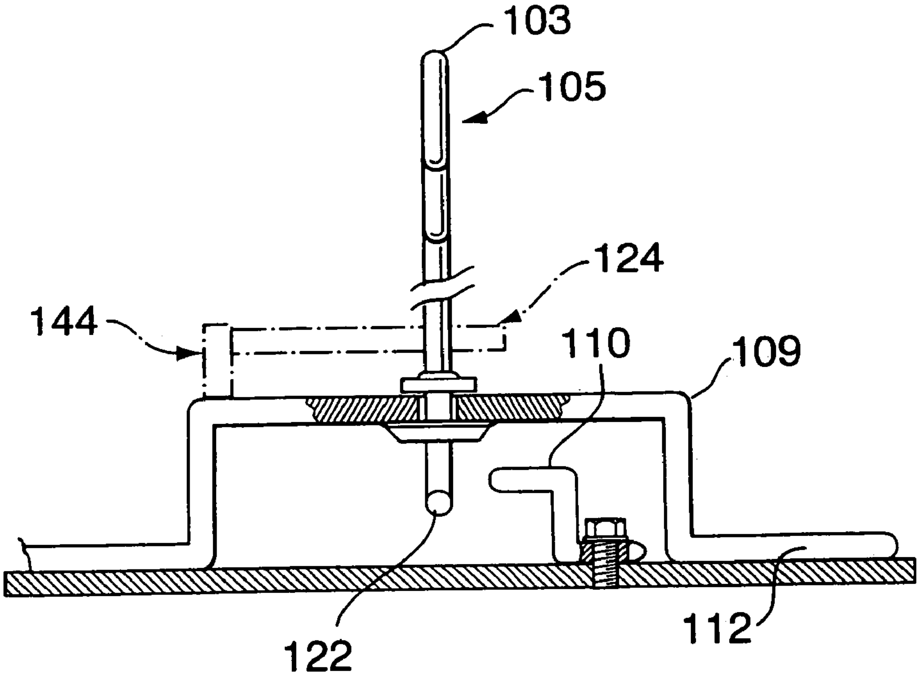
FIG. 2*b* is a side view of an embodiment of the handle and locking mechanism of the cylinder holder in the open or unlocked position.

FIGS. 2*a* and 2*b* are illustrations of one embodiment of the handle and locking mechanism. The handle (103) is used to engage the locking mechanism located in the recess (109) in the base of the holder (112) to secure the holder to a rail (110). FIG. 2*a* depicts a locking mechanism latch (122) when the handle (103) is in the closed or locked position (104). FIG. 2*b* depicts the locking mechanism latch (122) when the handle (103) is rotated 90° to the open or unlocked position (105). The recess is of sufficient size to cover the rail and allow for 90° of movement of a latch (122). The latch, which moves in concert with the handle, is positioned so that it overlaps with the underside edge of the rail (110) when in the handle is in the closed or locked position (104). The latch and rail, when engaged, will secure the holder from vertical or horizontal movement depending on the orientation of the holder with respect to the rail.

To insure that the handle (103) is either in a fully closed or locked position (104) or a fully open or unlocked position (105), a mechanism to restrict the rotation of the handle may be employed. One embodiment of the present invention utilizes an over-center mechanism shown in detail in FIG. 3.

As shown in FIG. 2*a*, shaft (108) extends from the handle (103) through a rotation control mechanism (124) to limit the position of the handle to the locking mechanism (122) located in the base of the holder. The weight of the holder is transferred up to the handle through a collar assembly (120 & 121). The lower collar (120) contacts the base of the holder inside the recess (109) and is capable of supporting the full weight of the holder and the two cylinders. The top portion of the collar (121) ensures the proper positioning of the locking mechanism latch (122) relative the rail (110) and maintains the positioning of the handle within the holder.

Figure 3:
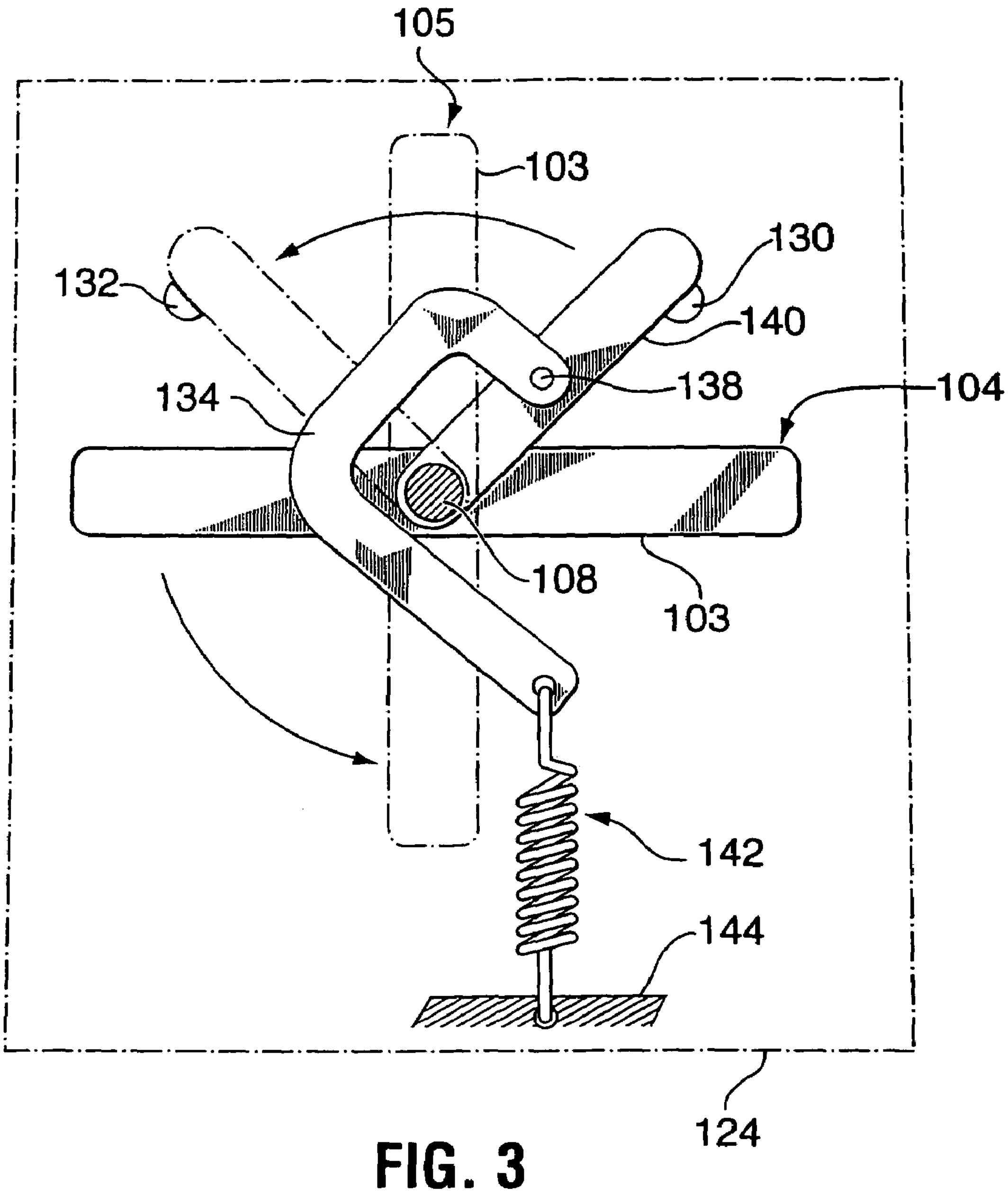
FIG. 3 is a detailed view of an embodiment of over-center mechanism used in one embodiment of the present invention and is located within the cylinder holder.

One possible embodiment of the rotational control mechanism (124) is an over-center mechanism depicted in FIG. 3. The over-center mechanism allows the handle to be at rest in only two positions, closed (104) or open (105) that are 90 ° apart. The rotation of an arm (140) is limited by stop points (130 & 132) that are secured to the frame of the holder. The opposite end of arm (140) rotates around shaft (108). A curved arm (134) is rotated about a pivot point at hinge pin (138) connected to arm (140). The opposite end of the curved arm (134) is tensioned by a spring (142) which is secured to a point on the frame of the holder (144). The spring ensures that the handle will only be in the opened or closed position by forcing the mechanism to rest against one of two stop points (130 & 132) thus stopping the travel of the arm (140) and limiting the rotation of the handle (103) to 90 ° The over-center mechanism is just one of many possible means by which to control the position of the handle. Other mechanisms could be implemented that would limit the movement of the handle to specific locations.

The cylinder holder can be stored in a horizontal or vertical configuration as shown in FIGS. 4 and 5. In FIG. 4, the rail (110) is mounted horizontally on the back of a rack (150) which may contain multiple shelves (152). The individual holders (100) are oriented vertically and guided into the frame by tracks (154) on the bottom of each shelf (152). The tracks (154) limit the lateral movement of the holder and aid in guiding the holder in to the frame in addition to ensuring alignment of the holder locking mechanism with the rail (110).

An alternate rack configuration would allow for vertical stacking of the holder such as depicted in FIG. 5. The rail (110) would be installed vertically in the back of a rack (160). Individual shelves or guide tracks (162) can be used to support the holders (100) vertically in the rack. The holders would be oriented horizontally and stacked on top of each other.

In either horizontal or vertical racking configurations, the process for inserting a holder into a rack would consist of placing the holder on the shelf with the handle (103) in the locked position (104). The holder then slides to the back of the rack using tracks (154 or 162) to guide the holder. Just prior to engaging the rail (110) or locking mechanism, the handle (103) is turned to the open position (105), moving the locking mechanism latch (122) 90° so that it will not interfere with the rail. The holder is then pushed flush with the back of the rack, the handle is turned back 90° to the locked position (104) engaging the locking mechanism latch (122) with the rail (110). The holder and cylinders are now secured to the rack.

Although it is preferred that the holder is used in conjunction with a rack, the holder can also be mounted in a compartment of a vehicle without a rack. The rail (110) could be oriented horizontally as in FIG. 4 or vertically as in FIG. 5 in the back of the compartment allowing for easy access to the holders. The locking mechanism would operate in a similar manner as described above.

In either configuration as described in FIG. 4 or 5 or when the holder is freestanding on its base, the handle (103) can be turned to the open position (105) to disengage the locking mechanism and allow access to the holder compartments (111). Once a cylinder has been removed or inserted, the locking mechanism would be re-engaged by turning the handle to the closed position (104). It is not required for both compartments to contain cylinders for the locking mechanism to engage properly or for the handle to secure a single cylinder in the holder.

It will be apparent to one skilled in the art that numerous modifications and departures from the specific embodiments described herein may be made without departing from the spirit and scope of the present invention.

What is claimed is:

1. A portable holder for holding two cylinders, said holder comprising:

a frame having an open top portion and a base portion forming two compartments, each compartment for holding a cylinder inserted into said compartments through said open top portion of said frame;

a grasping portion connectable to said frame in between said open top portion of said compartments, rotatable between an open position and closed position;

a shaft connected to said grasping portion extending between said two compartments through said frame to said base portion of said frame;

a locking mechanism connected to said shaft located in said base portion for engaging a receiving element connected to an external rack; and wherein when said grasping portion is in the open position, cylinders can be inserted or removed from said compartments and said locking mechanism is disengaged, and when said grasping portion is in the closed position, cylinders in said compartments are secured within said holder by said grasping portion and said locking mechanism is engaged.

2. The portable holder of claim 1, wherein the rotation of said grasping portion is mechanically restricted to resting either in said open position or in said closed position.

3. The portable holder of claim 1, wherein a top of said grasping portion, when in the closed position, does not extend above a valve assembly at the top of the cylinders when the cylinders are in said compartments.

4. The portable holder of claim 1, wherein a cupping portion is located on said base portion in each compartment, said cupping portion shaped to receive a cylinder base.

5. The portable holder of claim 1, wherein said locking mechanism can engage said receiving element affixed to the rack for securing said portable holder to the rack.

6. The portable holder of claim 5, wherein when said grasping portion is in the closed position, said locking mechanism engages with the receiving element to affix said portable holder to the rack and when said grasping portion is in the open position said locking mechanism disengages the receiving element to release said portable holder from the rack.

* * * * *